US009919679B2

(12) United States Patent
Tercero

(10) Patent No.: US 9,919,679 B2
(45) Date of Patent: Mar. 20, 2018

(54) ELECTRONIC KEY SYSTEM

(71) Applicant: DENSO CORPORATION, Kariya, Aichi-pref. (JP)

(72) Inventor: Carlos Tercero, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/308,676

(22) PCT Filed: Apr. 10, 2015

(86) PCT No.: PCT/JP2015/002037
§ 371 (c)(1),
(2) Date: Nov. 3, 2016

(87) PCT Pub. No.: WO2015/174012
PCT Pub. Date: Nov. 19, 2015

(65) Prior Publication Data
US 2017/0136990 A1    May 18, 2017

(30) Foreign Application Priority Data

May 15, 2014  (JP) .................................. 2014-101571

(51) Int. Cl.
*B60R 25/24* (2013.01)
*B60R 25/01* (2013.01)
(Continued)

(52) U.S. Cl.
CPC .............. *B60R 25/24* (2013.01); *B60R 25/01* (2013.01); *B60R 25/245* (2013.01); *E05B 81/54* (2013.01); *G07C 9/00* (2013.01)

(58) Field of Classification Search
CPC ....... B60R 25/01; B60R 25/24; B60R 25/245; E05B 81/54; G07C 9/00
See application file for complete search history.

(56) References Cited

U.S. PATENT DOCUMENTS 6,832,721 B2 * 12/2004 Fujii ....................... G06F 21/34
235/379
7,978,049 B2 * 7/2011 Leitch ..................... B60R 25/24
340/5.72

(Continued)

FOREIGN PATENT DOCUMENTS

JP    2002117377 A    4/2002
JP    2003134575 A    5/2003
(Continued)

Primary Examiner — Sisay Yacob
(74) Attorney, Agent, or Firm — Harness, Dickey & Pierce, P.L.C.

(57) ABSTRACT

In an electronic key system, at least one of an electronic key and a vehicle side device includes a communication device, a storage unit, and a discrimination unit. The storage unit acquires a location information from a location information terminal through the communication device, and stores information on an unlocking permissible range based on the location information when a vehicle door is locked. The discrimination unit acquires the location information from the location information terminal through the communication device, and discriminates whether the acquired location information falls within the unlocking permissible range, or not, when the wireless communication is performed between the electronic key and the vehicle side device because the vehicle door is unlocked. When the discrimination unit discriminates that the position of the electronic key does not fall within the unlocking permissible range, the vehicle door is not unlocked.

7 Claims, 5 Drawing Sheets

(51) Int. Cl.
   *E05B 81/54*   (2014.01)
   *G07C 9/00*    (2006.01)

(56) References Cited

U.S. PATENT DOCUMENTS

| | | |
|---|---|---|
| 2002/0070273 A1 | 6/2002 | Fujil |
| 2005/0149741 A1* | 7/2005 | Humbel ................ B60R 25/04 713/186 |
| 2008/0284564 A1 | 11/2008 | Leitch |
| 2015/0291129 A1 | 10/2015 | Saito |

FOREIGN PATENT DOCUMENTS

| | | |
|---|---|---|
| JP | 2005163522 A | 6/2005 |
| JP | 2007181119 A | 7/2007 |
| JP | 2008506107 A | 2/2008 |
| JP | 2013002111 A | 1/2013 |
| WO | WO-2013118454 A1 | 8/2013 |

* cited by examiner

ELECTRONIC KEY SYSTEM

CROSS REFERENCE TO RELATED APPLICATIONS

This application is a U.S. National Phase Application under 35 U.S.C. 371 of International Application No. PCT/JP2015/002037 filed on Apr. 10, 2015 and published in Japanese as WO 2015/174012 A1 on Nov. 19, 2015. This disclosure is based on and claims the benefit of priority from Japanese Patent Application No. 2014-101571 filed on May 15, 2014. The entire disclosures of all of the above applications are incorporated herein by reference.

TECHNICAL FIELD

The present disclosure relates to an electronic key system in which a vehicle side device mounted on a vehicle authenticates an electronic key carried by a user, and vehicle doors are locked and unlocked according to an authentication result, through a wireless communication between the electronic key and the vehicle side device.

BACKGROUND ART

A so-called smart key system that locks and unlocks vehicle doors through a wireless communication between an electronic key carried by a user and a vehicle side device mounted on a vehicle has been known. In the smart key system, when the vehicle doors are unlocked, the wireless communication is performed between the electronic key and the vehicle side device, and the vehicle side device needs to authenticate the electronic key. Since a distance range where the wireless communication can be performed is restricted to a relatively short distance, the electronic key is generally located in the vicinity of the vehicle side device.

However, when a malicious third party places a relay for relaying signals of the wireless communication between the electronic key and the vehicle side device, even if the electronic key is present in a position remote from the vehicle, the electronic key and the vehicle side device can wirelessly communicate with each other. As a result, the vehicle doors are likely to be unlocked contrary to the intention of the user. A technique in which the wireless communication between the electronic key and the vehicle side device is performed through such a relay is generally called "relay attack".

As a device for preventing the vehicle doors from being unlocked due to the relay attack, a device disclosed in, for example, Patent Literature 1 has been known. In the device disclosed in Patent Literature 1, each of the electronic key and the vehicle side device includes a GPS receiver. The electronic key transmits a signal including location information on the electronic key to the vehicle side device. The vehicle side device permits the vehicle doors to be unlocked on the condition that the location information of the electronic key matches the vehicle location information.

However, in the device of Patent Literature 1, each of the electronic key and the vehicle side device needs to have the GPS receiver for acquiring the location information. For that reason, the configuration of the overall device becomes complicated, resulting in a fault that the costs increase.

PRIOR ART LITERATURES

Patent Literature

Patent Literature 1: JP 2005-163522 A

SUMMARY OF INVENTION

It is an object of the present disclosure to provide an electronic key system which is capable of preventing a vehicle door from being unlocked by a relay attack even if both of an electronic key and a vehicle side device include no equipment for acquiring location information.

An electronic key system according to an aspect of the present disclosure is an electronic key system in which a vehicle side device mounted on a vehicle authenticates an electronic key carried by a user, and a vehicle door is locked and unlocked according to an authentication result, through a wireless communication between the electronic key and the vehicle side device. At least one of the electronic key and the vehicle side device includes a communication device, a storage unit, and a discrimination unit.

The communication device is configured to be communicatable with a location information terminal that is carried by the user and is capable of acquiring location information. The storage unit acquires the location information from the location information terminal through the communication device, and stores information on an unlocking permissible range based on the location information when the vehicle door is locked. The discrimination unit acquires the location information from the location information terminal through the communication device, and discriminating whether the acquired location information falls within the unlocking permissible range, or not, when the wireless communication is performed between the electronic key and the vehicle side device for unlocking the vehicle door. When the discrimination unit discriminates that the position of the electronic key does not fall within the unlocking permissible range, the vehicle door is not unlocked.

In the electronic key system, in a case where the user is remote from the vehicle when the wireless communication is performed between the electronic key and the vehicle side device for unlocking the vehicle door, it is discriminated by the discrimination unit that the location information of the electronic key does not fall within the unlocking permissible range. In that case, since the vehicle door is not unlocked, the vehicle door can be prevented from being unlocked by the relay attack. In this situation, in the electronic key system, since the location information indicative of the location of the user, that is, the location of the electronic key is acquired from the location information terminal when locking and unlocking the vehicle door, both of the electronic key and the vehicle side device do not need to provide an equipment for acquiring the location information. For that reason, a configuration for preventing the relay attack can be simplified, and the product costs can be reduced.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

An embodiment of an electronic key system according to the present disclosure will be described with reference to the drawings.

An electronic key system 1 according to the present embodiment includes a vehicle side device 10 mounted on a vehicle and a mobile device 20 functioning as an electronic key carried by a user. The vehicle side device 10 performs a wireless communication with the mobile device 20 when the mobile device 20 falls within a communicatable range. The vehicle side device 10 executes a so-called smart entry function of executing a control for unlocking vehicle doors and so on when a user touches any door knob when the vehicle side device 10 authenticates the mobile device 20 through the wireless communication, and the authentication of the mobile device 20 is successful, a so-called remote keyless entry function of executing a control for locking and unlocking the vehicle doors according to the operation of switches provided in the mobile device 20, and so on.

Figure 1:
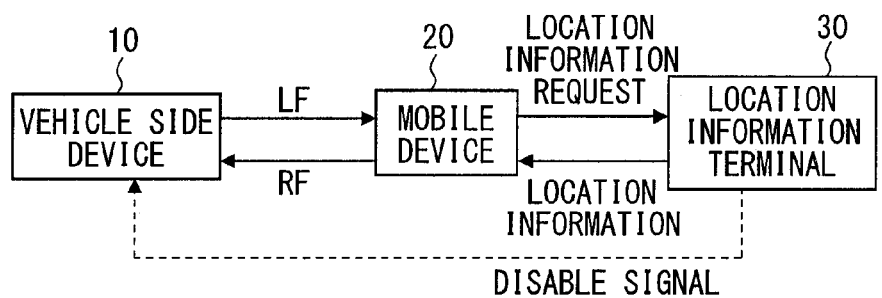
FIG. 1 is a block diagram illustrating an outline of an electronic key system according to an embodiment of the present disclosure.

In the electronic key system 1 according to the present embodiment, as illustrated in FIG. 1, the mobile device 20 is configured to be communicatable with a location information terminal 30 carried by the user. The location information terminal 30 can acquire location information in a state to be carried by the user, and can be configured by, for example, a cellular phone, a smartphone, a tablet information terminal, or the like. Those equipment can acquire the location information by a GPS receiver, or can acquire the location information with the use of a communication result with an access point.

When the vehicle doors are locked, the mobile device 20 acquires the location information from the location information terminal 30 and stores the acquired location information in the mobile device 20. When the wireless communication is performed between the mobile device 20 and the vehicle side device 10 for unlocking the vehicle doors, the mobile device 20 again acquires the location information from the location information terminal 30. The mobile device 20 discriminates whether the acquired location information falls within an unlocking permissible range based on the location information stored in the mobile device 20, or not. If it is discriminated that the acquired location information falls within the unlocking permissible range, the mobile device 20 continues the wireless communication for unlocking the vehicle doors, and if it is discriminated that the acquired location information does not fall within the unlocking permissible range, the mobile device 20 aborts the wireless communication for unlocking the vehicle doors.

In the case where the user is remote from the vehicle when the wireless communication is performed between the mobile device 20 and the vehicle side device 10 for unlocking the vehicle doors, it is discriminated that the location information acquired by the mobile device 20 does not fall within the unlocking permissible range, and the wireless communication between the mobile device 20 and the vehicle side device 10 is aborted. For that reason, in the vehicle side device 10, since the mobile device 20 is not authenticated, the vehicle doors cannot be unlocked by the smart entry function or the remote keyless entry function described above. As a result, the vehicle doors can be prevented from being unlocked by the relay attack. In the present embodiment, since the mobile device 20 acquires the location information from the location information terminal, both of the mobile device 20 and the vehicle side device 10 do not need to provide an equipment for acquiring the location information. For that reason, in the electronic key system, the configuration for preventing the relay attack can be simplified, and the product costs can be reduced.

Figure 2:
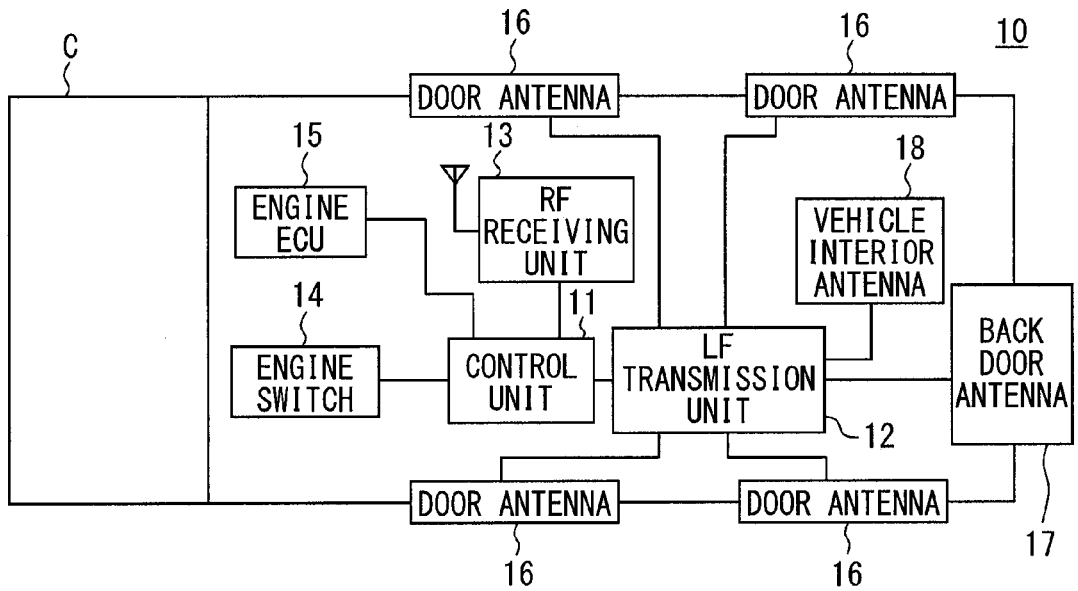
FIG. 2 is a block diagram illustrating an example of a configuration of a vehicle side device in the electronic key system of FIG. 1.

Hereinafter, the respective components of the electronic key system according to the present embodiment will be described in detail. A configuration example of the vehicle side device 10 is illustrated in FIG. 2. As illustrated in FIG. 2, the vehicle side device 10 includes a control unit 11, an LF transmission unit 12, an RF receiving unit 13, an engine switch 14, an engine ECU 15, door antennas 16, a back door antenna 17, a vehicle interior antenna 18, and so on.

The control unit 11 is configured by a known computer having a CPU, a ROM, a RAM, and so on not shown. In order to realize the functions such as the smart entry function and the remote keyless entry function described above, the control unit 11 executes a variety of processes according to a program stored in the ROM. The details of the smart entry function and the remote keyless entry function will be described later.

The LF transmission unit 12 is connected to the door antennas 16 disposed in respective doors of a vehicle C and the back door antenna 17 as LF antennas. The LF transmission unit 12 transmits signals (search signal, request signal, and so on) by radio waves of an LF band (for example, "30 to 300 [kHz]") toward the mobile device 20 through the respective door antennas 16, the back door antenna 17, and the vehicle interior antenna 18 according to a transmission instruction from the control unit 11. The respective signals transmitted from the LF transmission unit 12 arrive at only restricted communication areas through the door antennas 16, the back door antenna 17, and the vehicle interior antenna 18.

The RF receiving unit 13 includes an RF antenna, and receives the signals (reply signal, response signal, and so on) transmitted from the mobile device 20 by the radio waves of a UHF band (for example, "300 [MHz] to 3 [GHz]") through the RF antenna. The RF receiving unit 13 is connected to the control unit 11, and outputs the signals received by the RF antenna to the control unit 11.

The engine switch 14 is configured by a push switch to be operated by the user to start the operation of a vehicle-mounted engine not shown, and connected to the control unit 11. When the engine switch 14 is pushed by the user, an operation signal indicative of this fact is output to the control unit 11 from the engine switch 14. When the operation signal is output from the engine switch 14, the control unit 11 confirms whether a response signal to a request signal transmitted from the vehicle interior antenna 18 has been received by the RF receiving unit 13 from the mobile device 20, or not, and whether an ID code included in the response signal received by the RF receiving unit 13 matches a code to be authenticated, or not. When the confirmation is obtained, the control unit 11 controls a state of the vehicle C to be any one of "IG-ON (operation start of the vehicle mounted engine)", "ACC (accessary)", and "IG-OFF (operation stop of the vehicle mounted engine)" on the basis of the operation signal from the engine switch 14.

For example, when the control unit 11 controls the state of the vehicle C to be the state of "IG-ON", the control unit 11 outputs a signal for instructing the startup of the vehicle mounted engine to the engine ECU 15 for controlling the vehicle mounted engine. In response to the signal, the vehicle mounted engine starts to operate. At the same time, the respective vehicle-mounted devices except for the vehicle side device 10 are powered by a vehicle mounted battery not shown so as to be operable. Meanwhile, the vehicle side device 10 is powered and operable regardless of whether the engine is in operation or stops the operation.

Figure 3:
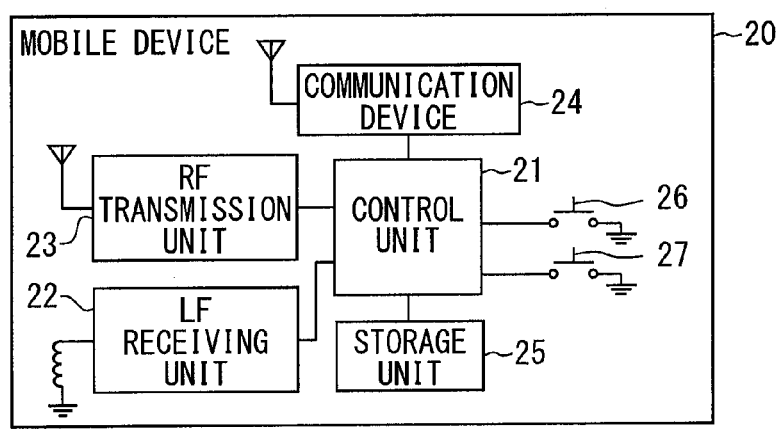
FIG. 3 is a block diagram illustrating an example of a configuration of a mobile device in the electronic key system of FIG. 1.

A configuration example of the mobile device 20 is illustrated in FIG. 3. As illustrated in FIG. 3, the mobile device 20 includes a control unit 21, an LF receiving unit 22, an RF transmission unit 23, a communication device 24, a storage unit 25, an unlocking switch 26, a lock switch 27, and so on.

The control unit 21 is configured by a known computer having a CPU, an internal memory, and so on not shown, and executes various processes according to programs which are stored and held in the internal memory, the storage unit 25 that is an external memory, or the like in advance.

The LF receiving unit 22 has an LF antenna and receives the signals transmitted by the radio waves of the LF band from the vehicle side device 10 through the LF antenna. The LF receiving unit 22 is connected to the control unit 21, and outputs the signals received by the LF antenna to the control unit 21. The RF transmission unit 23 has an RF antenna, and transmits the signals by the radio waves of the UHF band to the vehicle side device 10 through the RF antenna. The RF transmission unit 23 is connected to the control unit 21, and transmits the signals output from the control unit 21 from the RF antenna.

The communication device 24 communicates with the location information terminal 30 by the aid of a short-range wireless communication technology. As the short-range wireless communication technology, for example, a Bluetooth (registered trademark) or an infrared communication technology can be employed. The communication device 24 transmits a location information request signal to the location information terminal 30 according to an instruction from the control unit 21. Upon receiving the location information request signal from the mobile device 20, the location information terminal 30 returns a signal including the location information acquired at that time to the communication device 24. Meanwhile, in the location information terminal 30, when the location information could not be acquired (when the location information cannot be acquired, or the like), a signal indicative of that fact is transmitted to the communication device 24.

When the vehicle doors are locked by the smart entry function or the remote keyless entry function, the control unit 21 causes the communication device 24 to transmit the location information request signal. When a signal including the location information is returned from the location information terminal 30 in response to the location information request signal, the control unit 21 extracts the location information included in a return signal, and stores the location information in the storage unit 25. Meanwhile, the extracted location information per se may be stored, or the location information and area information indicative of an unlocking permissible range set on the basis of the communicatable range between the vehicle side device 10 and the mobile device 20 may be stored in the storage unit 25. The storage unit 25 is an example of the storage unit.

When the vehicle doors are unlocked by the smart entry function or the remote keyless entry function, the control unit 21 again transmits the location information request signal through the communication device 24. When a signal including the location information is returned from the location information terminal 30 in response to the location information request signal, the control unit 21 determines whether the location information during the unlocking state falls within the unlocking permissible range (a range in the vicinity of the vehicle C in which the unlocking of the vehicle doors may be permitted) set on the basis of the location information acquired when the vehicle doors are locked, or not. In the determination, if it is determined that the location information falls within the unlocking permissible range, the control unit 21 continues the wireless communication with the vehicle side device 10 for unlocking the vehicle doors. If it is determined that the location information does not fall within the unlocking permissible range, the control unit 21 aborts the wireless communication with the vehicle side device 10 for unlocking the vehicle doors.

The unlocking switch 26 and the lock switch 27 are switches to be operated by the user when the vehicle doors are locked or unlocked by the remote keyless entry function. Although not shown, the mobile device 20 includes a display unit for displaying characters or a lamp for performing various alarms and annunciations.

Next, a specific process to be executed in the vehicle side device 10 and the mobile device 20 in order to prevent the vehicle doors from being unlocked by a so-called relay attack with an example of the smart entry function will be described with reference to flowcharts of FIGS. 4 to 7.

Figure 4:
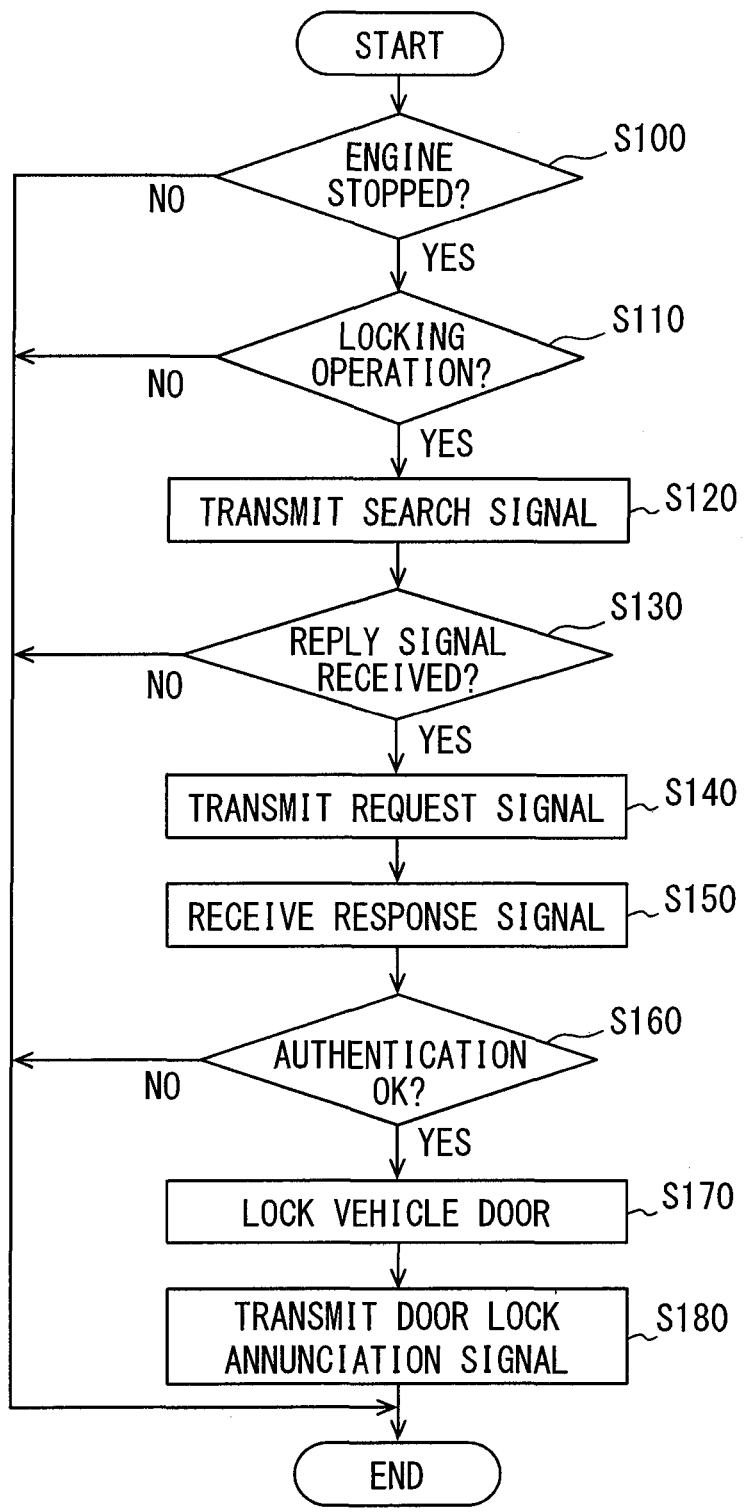
FIG. 4 is a flowchart illustrating a process to be executed in the vehicle side device when vehicle doors are locked by a smart entry function.
Figure 5:
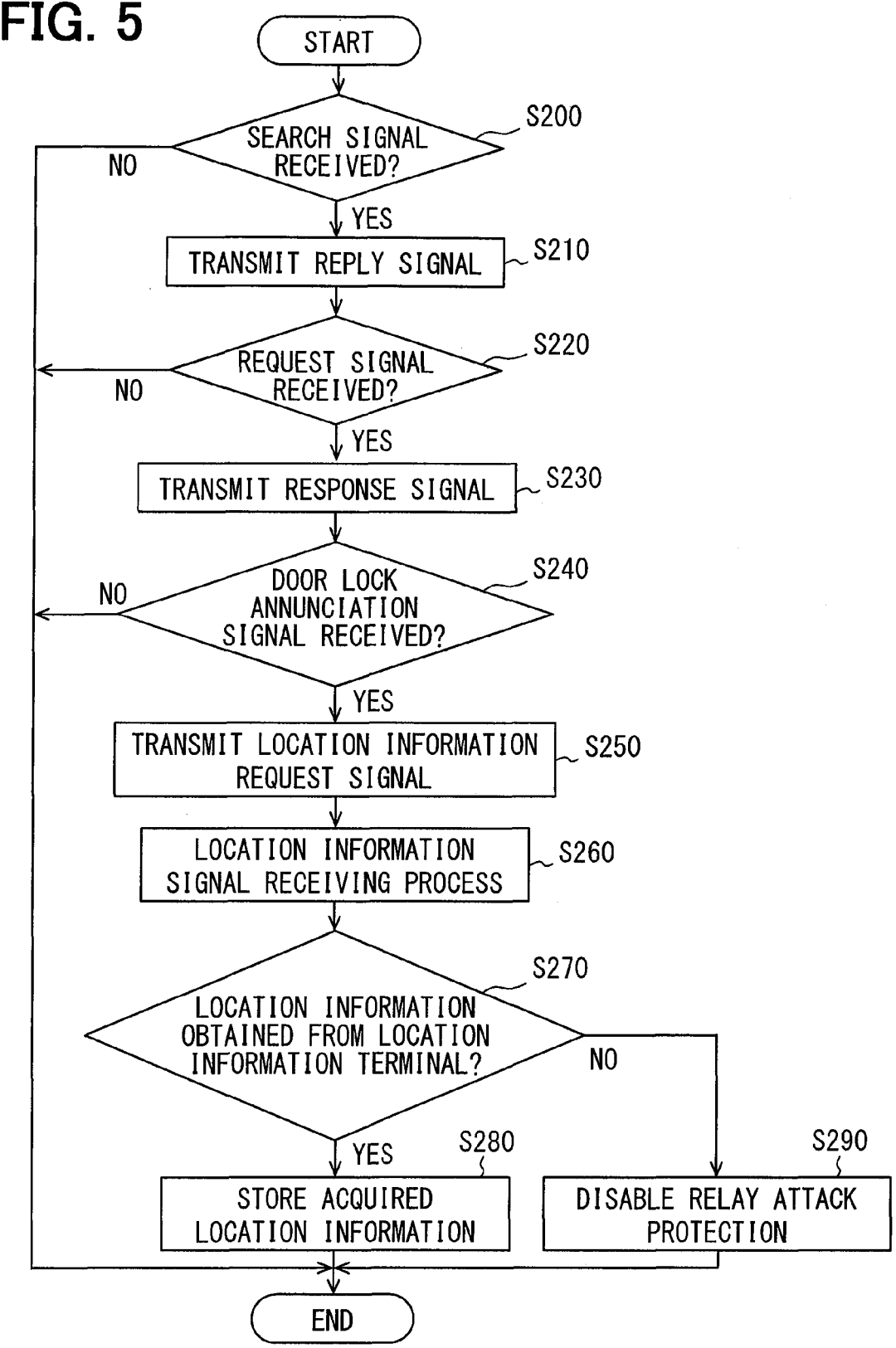
FIG. 5 is a flowchart illustrating a process to be executed in the mobile device when the vehicle doors are locked by the smart entry function.

The flowchart of FIG. 4 illustrates the process to be executed by the vehicle side device 10 when the vehicle doors are locked by the smart entry function, and the flowchart of FIG. 5 illustrates the process to be executed in the mobile device 20.

First, the process in the vehicle side device 10 will be described with reference to the flowchart of FIG. 4. The process illustrated in the flowchart of FIG. 4 is repetitively executed at predetermined intervals until the vehicle doors are locked.

First, in S100, it is determined whether the operation of the vehicle mounted engine has been stopped by the operation of the engine switch 14, or not. If the operation of the vehicle mounted engine is not stopped, the process illustrated in the flowchart of FIG. 4 is completed. On the other hand, if the operation of the vehicle mounted engine stops, the control proceeds to a process of S110.

In S110, it is determined whether the locking operation using the smart entry function has been performed by the user, or not. For example, it is determined whether the user has pushed a lock button disposed on a door knob after the user has gotten off the vehicle and closed all of the vehicle doors, or not. If it is determined that the locking operation using the smart entry function has not been performed, the process illustrated in the flowchart of FIG. 4 is completed. On the other hand, if it is determined that the locking operation using the smart entry function has been performed, the control proceeds to a process of S120.

In S120, a search signal for searching the mobile device 20 is transmitted from the door antennas 16, the back door antenna 17, and the vehicle interior antenna 18. Upon receiving the search signal, the LF receiving unit 22 of the mobile device 20 wakes up the control unit 21. Then, as will be described later, the control unit 21 transmits the reply signal to the vehicle side device 10.

In S130, it is determined whether the reply signal has been received from the mobile device 20, or not. If it is determined that the reply signal has not been received, since the mobile device 20 is not present in the communicatable range with the vehicle side device 10, the process illustrated in the flowchart of FIG. 4 is completed. On the other hand, if it is determined that the reply signal has been received, since the mobile device 20 is present in the communicatable range with the vehicle side device 10, the control proceeds to a process of S140.

In S140, a request signal for requesting the transmission of the response signal including the ID code is transmitted to the mobile device 20 from the door antennas 16, the back door antenna 17, and the vehicle interior antenna 18. In S150, a process of receiving the response signal from the mobile device 20 is performed by the RF receiving unit 13.

In S160, a response signal responsive to the request signal is received by the door antennas 16 or the back door antenna 17, and it is determined whether the authentication of the ID code included in the request signal has been successful, or not. In other words, it is determined whether the mobile device 20 is outside of the vehicle, and the mobile device 20 has been authenticated as a regular mobile device, or not. Therefore, in the case where the response signal from the mobile device 20 has not been received, when the response signal responsive to the request signal has been received by the vehicle interior antenna 18, and when the authentication of the ID code has not been successful, the authentication becomes no good in S160, and the process illustrated in the flowchart of FIG. 4 is completed.

On the other hand, when the response signal responsive to the request signal has been received by the door antennas 16 or the back door antenna 17, and the authentication of the ID code included in the request signal has been successful, the authentication is acceptable in S160, and the control proceeds to a process of S170.

In S170, the control unit 11 drives door locking motors not shown which are disposed in the respective doors of the vehicle C, and puts the respective doors into a locked state. In S180, a door lock annunciation signal is transmitted to the mobile device 20 for the purpose of informing the mobile device 20 of a fact that the vehicle doors have been locked.

Subsequently, the process in the mobile device 20 will be described with reference to the flowchart of FIG. 5. First, in S200, it is determined whether the search signal transmitted from the vehicle side device 10 has been received, or not, in other words, whether the search signal has been received by the LF receiving unit 22, and the control unit 21 has been woken, or not. If it is determined that the search signal has been received, the control proceeds to a process of S210.

In S210, the control unit 21 transmits the reply signal through the RF transmission unit 23. In S220, it is determined whether the request signal has been received from the vehicle side device 10, or not. If it is determined that the request signal has not been received, the process illustrated in the flowchart of FIG. 5 is completed. On the other hand, if it is determined that the request signal has been received, the control proceeds to a process of S230.

In S230, the control unit 21 transmits the response signal including a specific ID code through the RF transmission unit 23. In S240, it is determined whether the door lock annunciation signal has been received from the vehicle side device 10, or not. If it is determined that the door lock annunciation signal has not been received in the determination process, the process illustrated in the flowchart of FIG. 5 is completed. On the other hand, if it is determined that the door lock annunciation signal has been received, the control proceeds to a process of S250.

In S250, the control unit 21 transmits the location information request signal through the communication device 24. When the user carries the location information terminal 30 together with the mobile device 20, the location information request signal is received by the location information terminal 30. Then, the location information terminal 30 returns the signal including the location information acquired at that time to the mobile device 20. In S260, a process of receiving a signal including the location information returned from the location information terminal 30 is performed as described above.

In S270, it is determined whether the location information could be acquired from the location information terminal 30, or not. If the location information could be acquired from the location information terminal 30, it is determined as "YES" in S270, and the control proceeds to a process of S280. On the other hand, if the user has not carried the location information terminal 30, or if the location information terminal 30 could not acquire the location information under a circumstance where, for example, GPS radio waves could not be received, it is determined as "NO" in S270, and the control proceeds to a process of S290.

In S280, the acquired location information is stored and saved in the storage unit 25. As described above, the area information indicative of the unlocking permissible range based on the acquired location information may be stored in the storage unit 25. On the other hand, in S290, a function (relay attack protection function) of disabling the unlocking of the vehicle doors based on the location information is disabled. When the relay attack protection function based on the location information is disabled, when the wireless communication for unlocking which will be described later is performed, it is not determined whether the location information during the unlocking state falls within the unlocking permissible range, or not, but it is determined whether the unlocking is permitted, or not, on the basis of only the authentication result of the ID code as in the conventional art.

Figure 6:
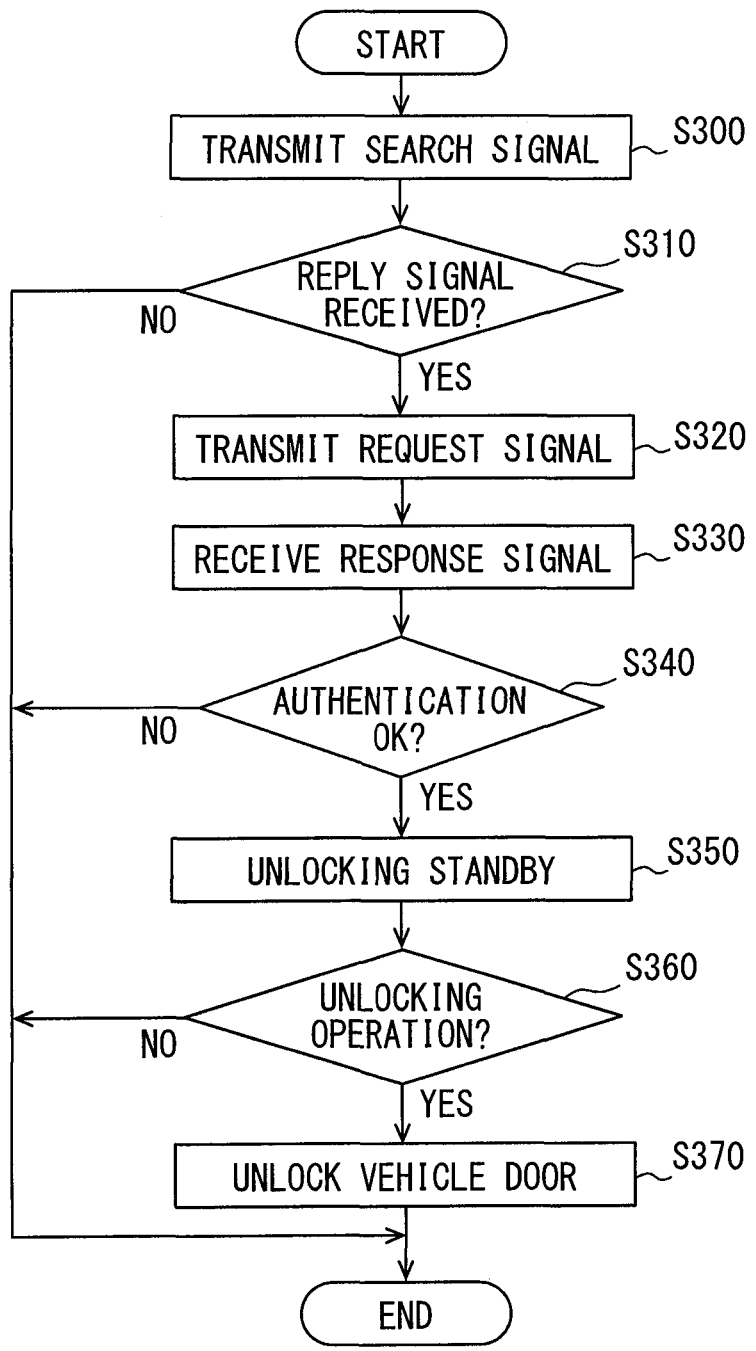
FIG. 6 is a flowchart illustrating a process to be executed in the vehicle side device when the vehicle doors are unlocked by the smart entry function.

Next, a process to be executed in the vehicle side device 10 when the vehicle doors are unlocked by the smart entry function will be described with reference to the flowchart of FIG. 6. The process illustrated in the flowchart of FIG. 6 is repetitively executed at predetermined intervals until the vehicle doors are unlocked.

First, in S300, a search signal for searching the mobile device 20 is transmitted from the door antennas 16 and the back door antenna 17. Upon receiving the search signal, the LF receiving unit 22 of the mobile device 20 wakes up the control unit 21. Then, the control unit 21 transmits the reply signal to the vehicle side device 10.

In S310, it is determined whether the reply signal has been received from the mobile device 20, or not. If it is determined that the reply signal has not been received, since the mobile device 20 is not present in the communicatable range with the vehicle side device 10, the process illustrated in the flowchart of FIG. 6 is completed. On the other hand, if it is determined that the reply signal has been received, since the mobile device 20 is present in the communicatable range with the vehicle side device 10, the control proceeds to a process of S320.

In S320, a request signal for requesting the transmission of the response signal including the ID code is transmitted to the mobile device 20 from the door antennas 16 and the back door antenna 17. In S330, a process of receiving the response signal from the mobile device 20 is performed by the RF receiving unit 13.

In S340, a response signal responsive to the request signal is received by the door antennas 16 or the back door antenna 17, and it is determined whether the authentication of the ID code included in the request signal has been successful, or not. In the determination process, when the response signal from the mobile device 20 has not been received, and when the response signal has been received, but the authentication of the ID code has not been successful, the authentication becomes no good in S340, and the process illustrated in the flowchart of FIG. 6 is completed. On the other hand, when the response signal responsive to the request signal has been received by the door antennas 16 or the back door antenna 17, and the authentication of the ID code included in the request signal has been successful, the authentication is acceptable in S340, and the control proceeds to a process of S350.

In S350, the vehicle side device 10 sets the vehicle doors in an unlocking standby state in which the vehicle doors are unlockable. In the unlocking standby state, for example, a current flows into a touch sensor for detecting that the user touches the door knob of the vehicle, and the touch sensor is put into a detection operable state. In S360, it is detected whether the unlocking operation has been performed, or not, according to whether that the user has touched the door knob is detected by the touch sensor, or not. If it is determined that the unlocking operation has not been performed, the process illustrated in the flowchart of FIG. 6 is completed. On the other hand, if it is determined that the unlocking operation has been performed, the control proceeds to a process of S370. In S370, the control unit 11 drives the door locking motors not shown, and puts the respective doors into an unlocked state.

Meanwhile, after the unlocking of the vehicle doors, a known control in the electronic key system of this type is executed. For example, when the vehicle doors are unlocked, and the vehicle doors are opened, the vehicle side device 10 starts the transmission of the request signal from the vehicle interior antenna 18. When the engine switch 14 is operated, the startup of the vehicle mounted engine is permitted on the condition that the response signal responsive to the request signal transmitted from the vehicle interior antenna 18 is received, and the authentication of the ID code included in the response signal is successful.

Figure 7:
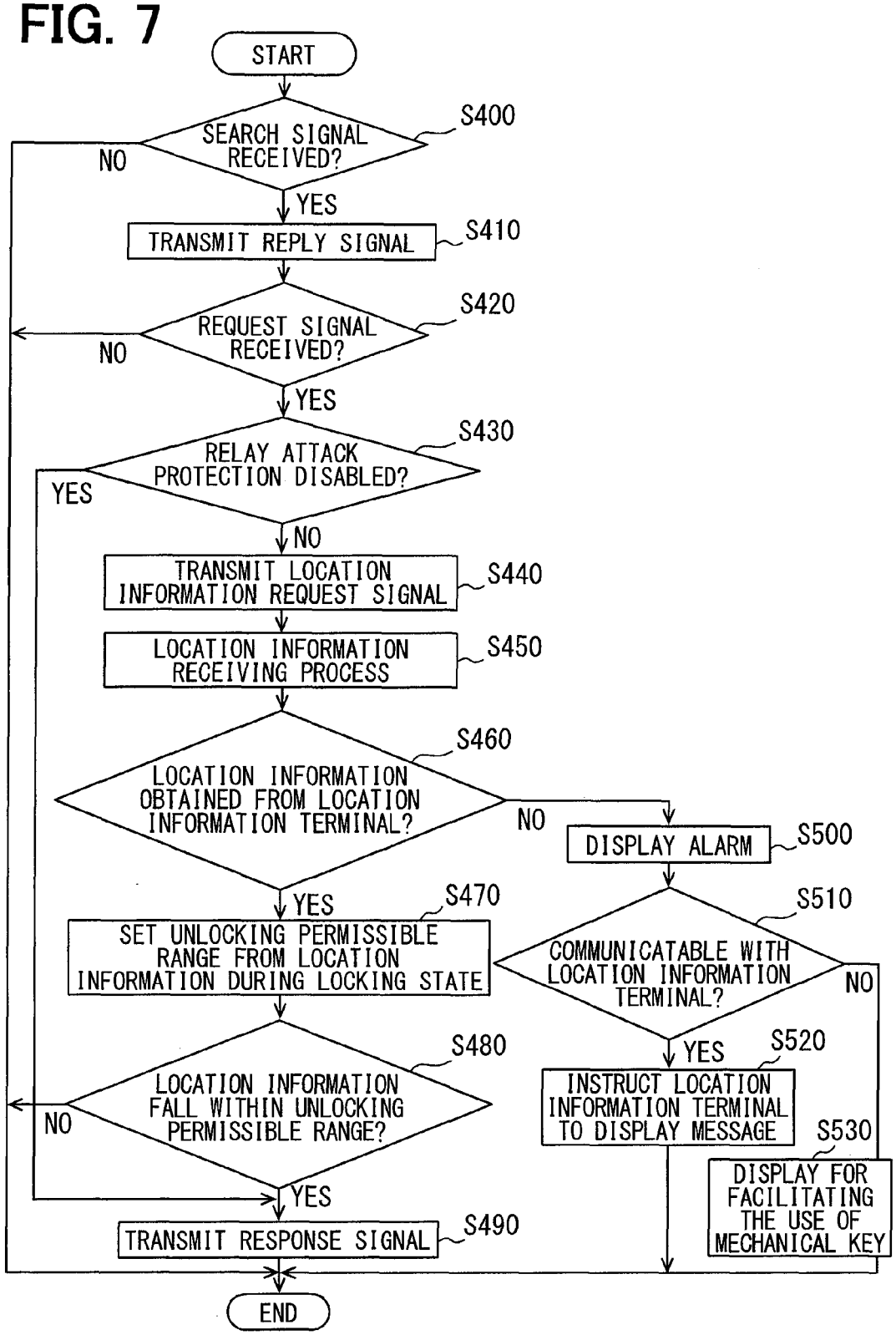
FIG. 7 is a flowchart illustrating a process to be executed in the mobile device when the vehicle doors are unlocked by the smart entry function.

Subsequently, a process to be executed in the mobile device 20 when the vehicle doors are unlocked by the smart entry function will be described with reference to the flowchart of FIG. 7.

In a state where the vehicle is stopped, and the respective doors are locked, since the process illustrated in the flowchart of FIG. 6 described above is periodically executed, the search signal is periodically transmitted from the vehicle side device 10. For that reason, in the case where the user who carries the mobile device 20 comes closer to the vehicle C for getting on the vehicle C, when the user falls within the communicatable range with the vehicle side device 10, the mobile device 20 receives the search signal from the vehicle side device 10. In this situation, the determination result in S400 becomes "YES", and a process in S420 is executed. In S420, the control unit 21 transmits the reply signal through the RF transmission unit 23.

Subsequently, in S420, it is determined whether the request signal has been received from the vehicle side device 10, or not. If it is determined that the request signal has not been received in the determination process, the process illustrated in the flowchart of FIG. 7 is completed. On the other hand, if it is determined that the request signal has been received, the control proceeds to a process of S430.

In S430, it is determined whether the relay attack protection function has been disabled, or not. In S290 of the flowchart in FIG. 5 described above, if the relay attack protection function has been disabled, the determination result in S430 becomes "YES". In that case, the process is jumped to S490. For that reason, it is not determined whether the location information during the unlocking state falls within the unlocking permissible range, or not, but it is determined whether the unlocking is permitted, or not, merely on the basis of only the authentication result of the ID code in the vehicle side device 10. On the other hand, if it is determined that the relay attack protection function has not been disabled, the control proceeds to a process of S440.

In S440, the control unit 21 transmits the location information request signal toward the location information terminal 30 through the communication device 24. When the user carries the location information terminal 30 together with the mobile device 20, the location information request signal is received by the location information terminal 30. Then, the location information terminal 30 returns the signal including the location information acquired at that time to the mobile device 20. In S450, a process of receiving the signal including the location information returned from the location information terminal 30 is performed.

In S460, it is determined whether the location information could be acquired from the location information terminal 30, or not. If the location information could be acquired from the location information terminal 30, it is determined as "YES" in S460, and the control proceeds to a process of S470. On the other hand, if the user has not carried the location information terminal 30, or if the location information terminal 30 could not acquire the location information, it is determined as "NO" in S460, and the control proceeds to a process of S500.

In S470, the location information stored in the storage unit 25 is read, and the unlocking permissible range for permitting the unlocking operation is set on the basis of the location information during the locking state and the communicatable range between the vehicle side device 10 and the mobile device 20. Meanwhile, when the area information indicative of the unlocking permissible range is stored in the storage unit 25, the process in S470 is omitted.

Subsequently, in S480, it is determined whether the location information acquired from the location information terminal 30 falls within the unlocking permissible range, or not. In other words, it is determined whether the location information indicative of the position of the mobile device 20 when the communication for unlocking the vehicle doors is performed between the vehicle side device 10 and the mobile device 20 falls within the unlocking permissible range determined on the basis of the location information during the locking state, or not. In the determination process, if it is determined that the location information falls within the unlocking permissible range, the user carrying the mobile device 20 is conceivable to be present in the vicinity of the vehicle C. For that reason, for the purpose of continuing the communication for unlocking the vehicle doors, the control proceeds to S490, and transmits the response signal from the mobile device 20. However, in the determination process of S480, if it is determined that the location information indicative of the position of the mobile device 20 does not fall within the unlocking permissible range, the process in the flowchart of FIG. 7 is completed without transmitting the response signal because there is the possibility of the relay attack. With the above configuration, in the vehicle side device 10, since the ID code necessary for the authentication cannot be acquired, the mobile device 20 is not authenticated with the result that the unlocking of the vehicle doors is also not permitted.

In addition, in S500 to be executed when the location information cannot be acquired from the location information terminal 30, the user is warned about a fact that the location information cannot be acquired from the location information terminal 30 by means of character display, lighting of a warning lamp, or the like in the mobile device 20.

Further, in S510, it is determined whether the mobile device 20 could communicate with the location information terminal 30, but could not acquire the location information, or the location information terminal 30 could not inherently communicate with the location information terminal 30, on the basis of the communication result with the location information terminal 30. If the mobile device 20 can communicate with the location information terminal 30, the control proceeds to S520, and a signal for instructing the display of a predetermined message is transmitted to the location information terminal 30.

For example, when a password registered as a disable signal in advance is transmitted to the mobile device 20 from the location information terminal 30, the relay attack protection function based on the location information can be disabled in the mobile device 20. As an example, it is conceivable that when receiving the registered password, the mobile device 20 sets the process so as to transmit the response signal to the request signal from the vehicle side device 10 unconditionally.

In the above case, for example, in the location information terminal 30, a fact that the vehicle doors can be unlocked even if the location information cannot be acquired by an input of the registered password is displayed as the predetermined message described above. As a result, even if the location information terminal 30 cannot acquire the location information when the user is to unlock the vehicle doors, the user can easily unlock the vehicle doors, and the convenience of the user can be improved.

On the other hand, in S510, if it is determined that the communication per se with the location information terminal 30 cannot be performed, the control proceeds to a process of S530. In S530, a display for urging the use of the mechanical key is performed by the character display, the lighting of the lamp, or the like in the mobile device 20. It is general that the mechanical key is incorporated into the mobile device 20 in the electronic key system so that the vehicle doors can be unlocked even if a battery is dead. When the mobile device 20 cannot communicate with the location information terminal 30, there is a possibility that the user misplaces the location information terminal 30 somewhere and does not hold the location information terminal 30. For that reason, in that case, the user is proposed to use the mechanical key with the use of the display function in the mobile device 20.

The relay attack protection according to the present embodiment with the example of the smart entry function has been described above. Similarly, in the case of the remote keyless entry function, the relay attack protection can be performed through the same technique.

In other words, in the case of the remote keyless entry function, when the lock switch 27 is operated, a signal including a predetermined ID code and locking instruction is transmitted to the vehicle side device 10. When the vehicle side device 10 receives the signal, the vehicle doors are locked. In this situation, when the mobile device 20 communicates with the location information terminal 30, acquires the location information from the location information terminal 30, and stores the acquired location information in the storage unit 25. As a result, the location information indicative of the position of the mobile device 20 when the vehicle doors are locked can be stored in the storage unit 25.

When the unlocking switch 26 is operated, the mobile device 20 first communicates with the location information terminal 30, and acquires the location information on the mobile device 20 during the unlocking operation. If the acquired location information during the unlocking operation falls within the unlocking permissible range based on the location information stored in the storage unit 25, the mobile device 20 transmits the signal including the predetermined ID code and unlocking instruction to the vehicle side device 10. In other words, if the location information during the unlocking operation does not fall within the unlocking permissible range, the communication from the mobile device 20 to the vehicle side device 10 is not performed, and the unlocking operation of the vehicle doors is prohibited.

Meanwhile, a process when the mobile device 20 cannot acquire the location information from the location information terminal 30 may be performed in the same manner as that in the case of the smart entry function.

Also, the communicatable range between the vehicle side device 10 and the mobile device 20 by the remote keyless entry function is wider than the communicatable range by the smart entry function. For that reason, the unlocking permissible range by the remote keyless entry function may be set to be wider than the unlocking permissible range by the smart entry function. However, because the communicatable range in the smart entry function is as wide as about a dozen m at the most, the unlocking permissible range may be common to both of those functions.

The embodiment of the present disclosure has been described above, but the present disclosure is not limited to the above-mentioned embodiment at all and can be modified without departing from the gist of the present disclosure.

For example, in the embodiment described above, the example in which the mobile device 20 communicates with the location information terminal 30 has been described. However, the vehicle side device 10 may communicate with the location information terminal 30 directly or through the mobile device 20. In other words, the storage of the location information when the vehicle doors have been locked, and the determination of whether the user position when the vehicle doors are to be unlocked falls within the unlocking permissible range, or not, may be performed in the vehicle side device 10. Similarly, in this case, the relay attack protection can be realized in the same technique as that in the embodiment described above.

In other words, when the vehicle doors are locked, the vehicle side device 10 communicates with the location information terminal 30, acquires the location information on the mobile device 20 (user), and stores the location information in the storage unit. When the wireless communication for unlocking the vehicle doors is performed between the vehicle side device 10 and the mobile device 20, the vehicle side device 10 communicates with the location information terminal 30, to thereby again acquire the location information. It can be discriminated whether a regular user is to unlock the vehicle doors, or the unlocking operation is to be performed by the relay attack, according to whether the acquired location information falls within the unlocking permissible range set on the basis of location information stored in the storage unit, or not. If the unlocking operation is to be performed by the relay attack, the authentication of the mobile device 20 through the wireless communication with the mobile device 20 is denied, thereby being capable of realizing the relay attack protection.

Meanwhile, when the location information cannot be acquired from the location information terminal 30 when the vehicle doors are unlocked, the disable signal may be transmitted to the vehicle side device 10 from the location information terminal 30 in the same manner as that in the embodiment described above as illustrated in FIG. 1.

Further, both of the vehicle side device 10 and the mobile device 20 may communicate with the location information terminal 30, and perform the relay attack protection based on the location information.

What is claimed is:

1. An electronic key system in which a vehicle side device mounted on a vehicle authenticates an electronic key carried by a user, and a vehicle door is locked and unlocked according to an authentication result, through a wireless communication between the electronic key and the vehicle side device, at least one of the electronic key and the vehicle side device comprising:
   a communication device configured to be communicatable with a location information terminal that is carried by the user and is capable of acquiring location information;
   a storage unit acquiring the location information from the location information terminal through the communication device, and storing information on an unlocking permissible range based on the location information when the vehicle door is locked; and
   a discrimination unit acquiring the location information from the location information terminal through the communication device, and discriminating whether the acquired location information falls within the unlocking permissible range, or not, when the wireless communication is performed between the electronic key and the vehicle side device for unlocking the vehicle door, wherein
   when the discrimination unit discriminates that the position of the electronic key does not fall within the unlocking permissible range, the vehicle door is not unlocked, and
   the electronic key includes a display unit that performs a display for informing the user of a fact that the location information is not capable of being acquired in a case where the location information is not capable of being acquired from the location information terminal when the wireless communication is performed between the electronic key and the vehicle side device because the vehicle door is unlocked.

2. The electronic key system according to claim 1, wherein
   the storage unit stores the location information acquired from the location information terminal when the vehicle door is locked as the information on the unlocking permissible range, and
   the unlocking permissible range is defined on the basis of the location information stored in the storage unit taking a communicatable distance between the electronic key and the vehicle side device into account.

3. The electronic key system according to claim 1, wherein
   the storage unit stores the location information when the vehicle door is locked and area information indicative of the unlocking permissible range determined on the basis of the communicatable distance between the electronic key and the vehicle side device, as the information on the unlocking permissible range.

4. The electronic key system according to claim 1, wherein
   the vehicle door is capable of being unlocked when a mechanical key is used,
   the electronic key includes a communication device for communicating with the location information terminal, and
   in a case where the electronic key is not communicatable with the location information terminal through the communication device when the wireless communication is performed between the electronic key and the vehicle side device for unlocking the vehicle door, the electronic key performs a display for urging the user to use the mechanical key using the display unit.

5. The electronic key system according to claim 1, wherein
   the electronic key includes a communication device for communicating with the location information terminal, and
   when the electronic key is communicatable with the location information terminal through the communication device although the electronic key is not capable of acquiring the location information from the location information terminal, the electronic key transmits a signal for performing a display that facilitates operation for disabling a function of preventing the vehicle door from being unlocked on the basis of the location information to the location information terminal.

6. The electronic key system according to claim 1, wherein
   at least one of the electronic key and the vehicle side device includes a disabling unit that disables the function of preventing the vehicle door from being unlocked on the basis of the location information when receiving a predetermined disable signal from the location information terminal through the communication device.

7. An electronic key system in which a vehicle side device mounted on a vehicle authenticates an electronic key carried by a user, and a vehicle door is locked and unlocked according to an authentication result, through a wireless communication between the electronic key and the vehicle side device, at least one of the electronic key and the vehicle side device comprising:
   a communication device configured to be communicatable with a location information terminal that is carried by the user and is capable of acquiring location information;
   a storage unit acquiring the location information from the location information terminal through the communication device, and storing information on an unlocking permissible range based on the location information when the vehicle door is locked; and
   a discrimination unit acquiring the location information from the location information terminal through the communication device, and discriminating whether the acquired location information falls within the unlocking permissible range, or not, when the wireless communication is performed between the electronic key and the vehicle side device for unlocking the vehicle door, wherein when the discrimination unit discriminates that the position of the electronic key does not fall within the unlocking permissible range, the vehicle door is not unlocked, and at least one of the electronic key and the vehicle side device includes a disabling unit that disables the function of preventing the vehicle door from being unlocked on the basis of the location information in a case where the location information is not capable of being acquired from the location information terminal when the vehicle door is locked.

* * * * *